United States Patent [19]
Chartoff et al.

[11] Patent Number: 6,117,385
[45] Date of Patent: Sep. 12, 2000

[54] METHOD AND APPARATUS FOR STEREOLITHOGRAPHY

[75] Inventors: Richard P. Chartoff, Cincinnati; John W. Schultz, Centerville; Jill S. Ullett, Dayton, all of Ohio

[73] Assignee: The University of Dayton, Dayton, Ohio

[21] Appl. No.: 09/128,078

[22] Filed: Aug. 3, 1998

Related U.S. Application Data

[60] Provisional application No. 60/055,104, Aug. 6, 1997.

[51] Int. Cl.$^7$ .............................. B29C 35/08; B29C 41/02
[52] U.S. Cl. ............................................. 264/401; 264/435
[58] Field of Search ................................... 264/308, 401, 264/435, 494

[56] References Cited

U.S. PATENT DOCUMENTS

| | | | |
|---|---|---|---|
| 4,810,433 | 3/1989 | Takayanagi et al. | 264/435 |
| 5,545,367 | 8/1996 | Bae et al. | 264/401 |

FOREIGN PATENT DOCUMENTS

| | | | |
|---|---|---|---|
| 62-70406 | 3/1987 | Japan | 264/435 |

*Primary Examiner*—Leo B. Tentoni
*Attorney, Agent, or Firm*—Killworth, Gottman, Hagan & Schaeff LLP

[57] ABSTRACT

A method and apparatus for producing ordered parts by stereolithography from non-ordered liquid crystal monomers. Liquid crystal monomers contain stiff, rod-like mesogenic segments which can be aligned by an external force such as shear, electric field or magnetic field, causing an anisotropy in properties. When cured in the aligned stated by photopolymerizing the aligned monomers the anisotropic structure is "locked in" resulting in materials with anisotropic physical and mechanical properties. The rigid structure of the mesogenic segments can result in cured networks with high glass transition temperatures if the spacer groups which connect the mesogenic core with the reactive end groups are kept short. Glass transition temperatures of postcured parts ranged from 75 to 148° C. depending on resin and processing conditions. A mechanical anisotropy on the order of two was measured for aligned samples.

10 Claims, 10 Drawing Sheets

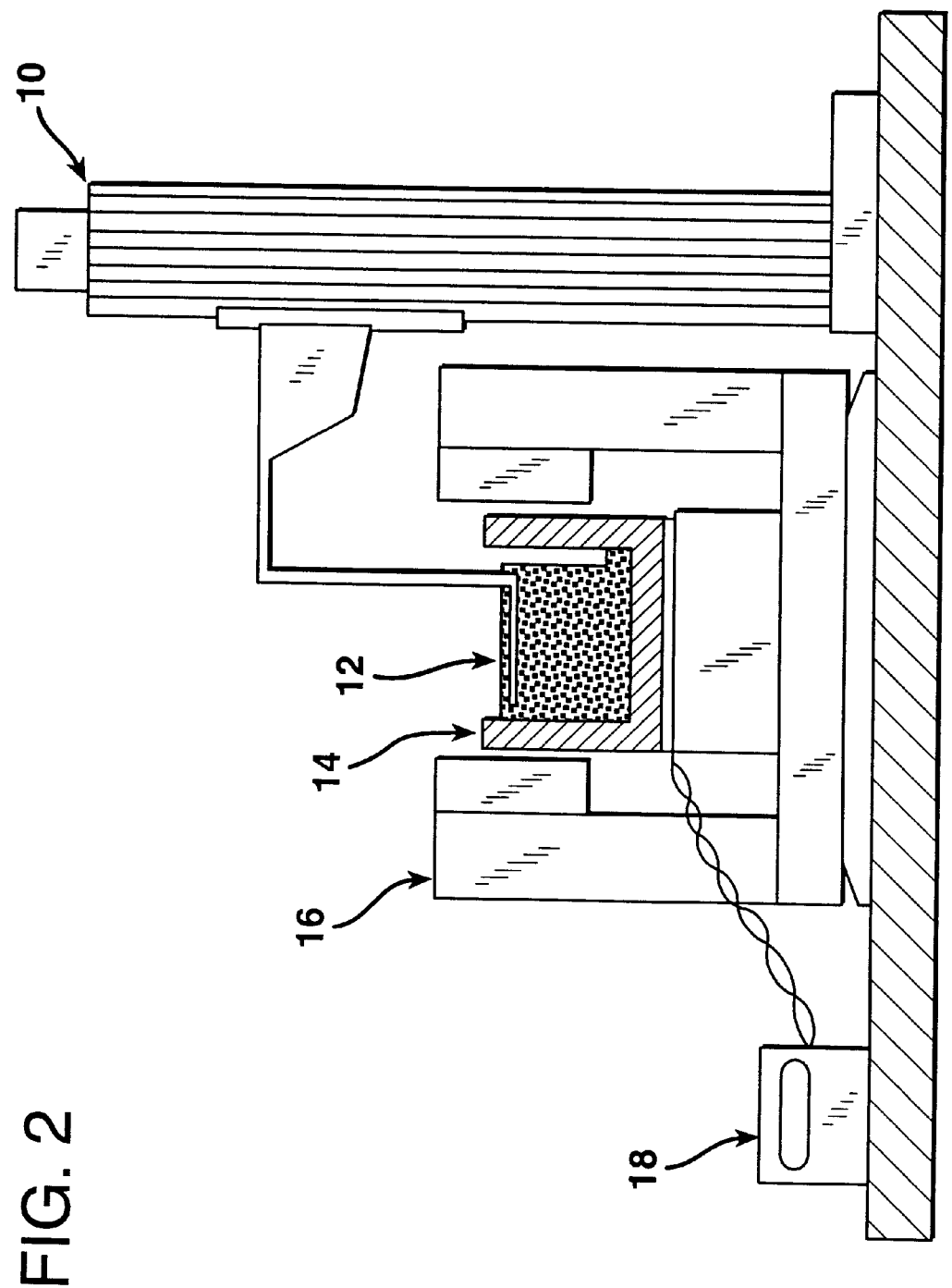

METHOD AND APPARATUS FOR STEREOLITHOGRAPHY

CROSS-REFERENCE TO RELATED APPLICATIONS

This application claims the benefit of U.S. Provisional Application No. 60/055,104, filed Aug. 6, 1997. Reference is also made to related U. S. Provisional Application No. 60/077,467, filed Mar. 10, 1998 for "Rigid-Rod Monomers for Polymers in Rapid Prototyping and Composites."

BACKGROUND OF THE INVENTION

The present invention relates to a method and apparatus for stereolithography. More particularly, it relates to a method and apparatus for providing ordered parts by stereolithography from non-ordered liquid crystal monomers.

The applications for stereolithography parts have grown from simple visualization of engineering designs to fabrication of functional end-use prototypes. With the growth of applications has come a need for higher performance resins. In particular, the upper-use temperatures of cured resins needs to approach or exceed 200 ° C. for applications such as directly formed molds for injection molding, and under-the-hood automotive applications. Improved mechanical properties such as modulus and impact strength are also important for these applications. Dimensional accuracy has been a key issue for rapid building of functional parts. Dimensional accuracy is a function of resin shrinkage, draw style patterns, beam diameter compensation, galvanometer calibration, etc. While part accuracy has improved dramatically since the inception of stereolithography, further improvements are possible.

Accordingly, the need exists for an improved stereolithographic method and apparatus which can be used to build parts having anisotropic properties and having upper use temperatures exceeding 100° C.

SUMMARY OF THE INVENTION

That need is met by the present invention which provides an apparatus and process for aligning liquid crystal (LC) monomers and then photopolymerizing via stereolithography to produce parts having glass transition temperatures exceeding those possible with commercially available stereolithography resins, and having optimized mechanical properties. Parts with isotropic, anisotropic, or a combination (as a function of location in the part) of isotropic and anisotropic properties may be produced by varying the layer-to-layer alignment of the LC monomer or by varying the cure temperature (i.e., varying the mesogenic state). Thermosetting liquid crystal monomers contain rod-like mesogenic cores connected by alkane spacers to reactive end-groups. Like crystalline solids, LC materials have some kind of long range molecular order, however, they lack the three-dimensional transnational order found in truly crystalline materials.

The simplest type of mesogenic phase is called nematic. In nematic phases, the molecular axis are on average parallel but lack any kind of transnational order as indicated in FIG. 1A. Smectic phases have both uniaxial molecular orientation and some degree of translational order as indicated in FIG. 1B. Many different types of smectic phases have been identified. Some are more fluid in nature (e.g., smectic A) while others are more solid in nature (e.g., smectic D). At the curing temperature, order disappears and the phase structure becomes isotropic as indicated in FIG. 1C. The viscosity of nematics can be considerably lower than that of smectics, on the other hand, smectics have a higher degree of order.

Macroscopic alignment of the LC monomer in a preferred direction can be induced by a variety of means such as by rubbed substrates, magnetic field, electric field, and shear. Photopolymerization, such as by UV laser or visible light laser, of the LC monomer in the aligned state "locks" in the anisotropic structure resulting in materials with anisotropic physical and mechanical properties. A photoinitiator is added in an amount of between about 0.1 and about 4% by weight and preferably between about 0.5% and about 2.0% by weight prior to photopolymerization. Mechanical strength and stiffness are greater in the molecular alignment direction than in the transverse direction. Also, because the reactive end groups are more tightly packed, cure in an aligned state results in lower shrinkage than is obtained with conventional resins.

Layered objects can be "built" using LC monomers where the layers or regions within the layers are aligned using an external force such as shear, electrical field, or magnetic field forces or combinations thereof. Thus, a magnet may be used to create layers in which the molecular alignment within sections of each layer may be altered by controlling the angle between the magnetic poles and the build axis. In a preferred embodiment, the layers or areas within the layers may be aligned using a magnet on a rotating platform.

Thus, the preferred apparatus of the present invention is a conventional stereolithography apparatus with the addition of a magnet outside the vat in order to align the monomer before cure. The magnet is positioned on a rotatable platform so that alignment can be established at any angle relative to the galvanometer axis. The vat is temperature controlled over a wide range of from about 50° C. to about 150° C. This is desirable so that it is possible to work with all LC phases: smectic, nematic and isotropic. Optionally, the apparatus may contain a molecular alignment measurement device such as an ellipsometry device. Ellipsometry is analogous to birefringence except that reflectance measurements are used instead of transmitted light.

Accordingly, it is an object of the present invention to provide a method for producing ordered objects by stereolithography from initially non-ordered liquid crystal monomers. It is also an object of the present invention to provide parts produced by such a method. It is a further object of the present invention to provide an apparatus for performing such a process.

These and other objects and advantages of the present invention will become apparent from the detailed description of the preferred embodiments and claims presented below.

BRIEF DESCRIPTION OF THE DRAWINGS

FIG. 2 is a schematic illustration of the preferred apparatus of the present invention.

DETAILED DESCRIPTION OF THE PREFERRED EMBODIMENTS

Figure 1C:
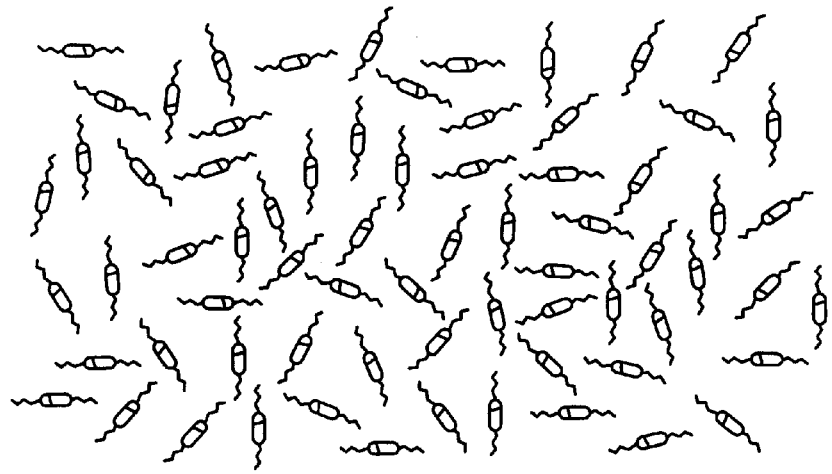
FIG. 1C is a schematic illustration of monomer molecules in an isotropic phase.
Figure 1B:
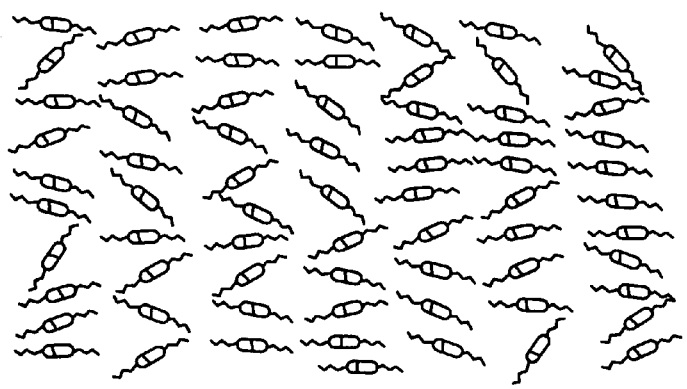
FIG. 1B is a schematic illustration of monomer molecules in a smetic phase.
Figure 1A:
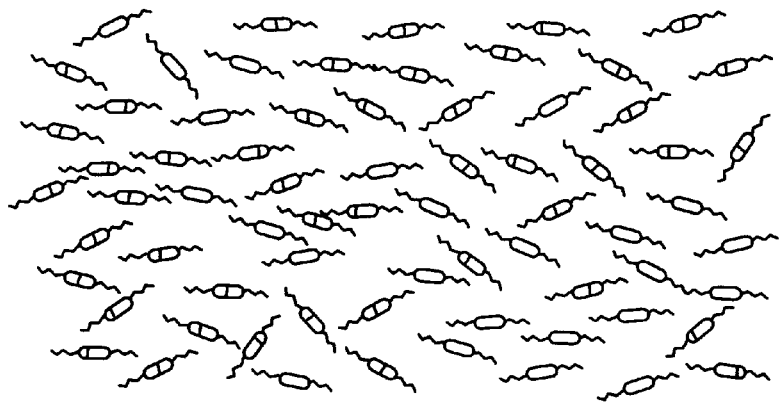
FIG. 1A is a schematic illustration of monomer molecules in a nematic phase.

The apparatus for use in performing the process of the present invention is shown in FIG. 2. As shown, elevator stage 10 is used to move building platform 12 to the appropriate level. Building platform 12 contains an Argon UV laser, a galvanometer and associated circuiting connecting to a power source, all as described in M. Pellechia and A. Lightman, "Development of a Table-Top Stereolithography and Its Application to Solid Modeling of Human Tissue," *Proceeding of The Fifth Int. Conf. On Rapid Prototyping*, Dayton, Ohio, Jun. 12–15, 1994, pp 99–108. The LC monomer to be photopolymerized is placed in resin vat 14 along with a photoinitiator. A molecular alignment measurement device such as an ellipsometry device may be associated with the vat 14 to provide for in situ measurements. Rotatable magnet 16 is used to align the LC monomer. The rotatable magnet is preferably a permanent magnet having a field strength of 3200 Oersted across a 10 cm gap. Alternatively an electric field or a shear field may be used in place of rotatable magnet 16. By using a magnetic or electrical field objects with a high degree of order can be created from initially non-ordered rigid-rod monomers. By using a rotating magnet it is possible to align the LC monomers at any angle relative to the part build axis. It is also possible to produce a part having layers in which the molecular alignment within each layer or sections of each layer can be altered by controlling the angle between the magnetic poles and the build axis. While conventional stereolithography processes are preformed at room temperature, the apparatus of the present invention has a heater controller 18 so that the monomer may be processed at elevated temperatures. Heater controller 18 allows objects to be formed at different temperatures, which may range from about 50° C. to about 150° C., for example.

Objects made by the method of the present invention can be used for any application but particularly for direct fabrication of polymeric injection molds, parts for under-hood automotive applications, objects to be used for wind tunnel tests, and medical models or surgical/prosthetic devices that must be autoclave sterilized prior to use. That is because it is possible with the present method to create ordered objects that have upper use temperatures exceeding 100° C. and as high as 200° C. or greater.

EXAMPLE

Two liquid crystal monomers having the structure shown below were used in this example:

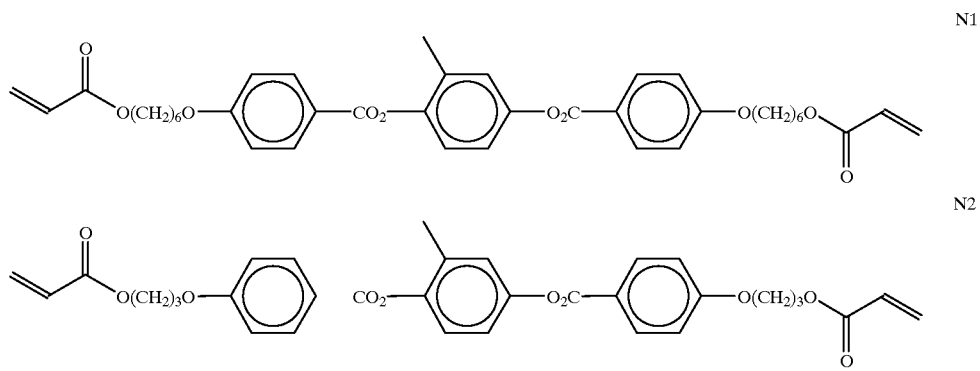

The monomers differ only in the length of the alkyl spacer groups. Monomer N1 has a spacer length of six-$CH_2$— groups while monomer N2 has a spacer length of three. Both monomers exhibit broad nematic phases above room temperature. Broer and co-workers first reported on these monomers. See D. J. Broer, G. N. Mol, G. Challa, "In situ photopolymerization of an oriented liquid-crystalline acrylate, 5, Influence of the alkylene spacer on the properties of the mesogenic monomers and the formation and properties of oriented polymer networks, " *Makromol. Chem.*, 192, (1991) 59–74; D. J. Broer, G. N. Mol, G. Challa "Temperature effects on the kinetics of photoinitiated polymerization of dimethacrylates," *Polymer*, 32, (1991) 690–695; D. J. Broer, J. Boven, G. N. Mol, G. Challa, "In situ photopolymerization of an oriented liquid-crystalline acrylate, 3, Oriented polymer networks from a mesogenic diacrylate," *Makromol. Chem.*, 190 (1989) 2255–2268; and D. J. Broer, R. A. M. Hikmet, G. Challa, "In situ photopolymerization of an oriented liquid-crystalline acrylate, 4, Influence of a lateral methyl substituent on monomer and oriented polymer network properties of a mesogenic diacrylate," *Makromol, Chem.*, 190, (1989) 3201–3215. The photo-initiators used were obtained from Ciba-Geigy. Methylene-chloride was used for mixing the photo-initiators with the monomers and was used as-received from Fisher Scientific (99.9% pure).

Dielectric permittivity of the monomers was measured as a function of temperature and time in the presence of a magnetic field to estimate the molecular order parameter and re-orientation time constants. Samples consisted of approximately 250 mg of monomer sandwiched between two parallel gold electrodes that were 0.3 mm apart. A permanent magnet having a field strength of 3200 Oersted across a 10 cm gap was used to orient the monomers in their nematic state suing the apparatus of the present invention as described above. The permittivity was measured with a Hewlett Packard 4192A impedance analyzer using an excitation potential of 1 Volt. In the frequency range of this instrument (5 Hz to 13 MHz), there was no detectable dipole relaxation so both the permittivity and loss factor curves were relatively flat. The data were taken at 100 KHz.

Parts were also built using the apparatus of the present invention, again with the magnet having an adjustable gap with the field strength of 3200 Oersted over a gap of 10 cm. The mini-vat used was made of aluminum and was temperature controlled. An Argon-ion laser from Coherent was used to build parts. A broad-spectrum UV flood lamp was used for postcure.

Widely spaced strands were drawn such that there was no overlap of adjacent strands. A typical center-to-center spacing used was 1.02 mm (40 mils). The dimensions of the part were approximately 3 cm×1 cm. Cure depths were measured using Mitutoyo digital micrometer. Measurements were made away from the borders and the diagonal corner-to-corner strands. Thus, the average cure depth of single strands was measured. Energy density was calculated by the following expression:

$$E_{max} = (2/\pi)^{1/2} P_v/(w_0 v_d) \quad [mJ/cm^2] \quad \text{Eq. 1}$$

where: $E_{max}$ is the maximum energy at the vat,
$P_v$ is the laser power at the vat, mW,
$w_0$ is the beam radius at 1/e its intensity, and
$v_d$ is the draw speed, cm/s.

The draw speed, $v_d$, can be varied as can the power, $P_v$. The beam radius $w_0$ is a function of the system optics and was constant for all experiments. Working curve parameters can be calculated by using the equation below:

$$C_d = D_p \ln E_{max}/E_c \quad [mils] \quad \text{Eq. 2}$$

where: $C_d$ is the measured cure depth of a strand,
$D_p$ is the penetration depth at which the beam intensity is reduced to 1/e of its surface value,
$E_{max}$ is the maximum energy at the monomer surface,
$E_c$ is the critical energy required for gelation.

Double-pass parts were made by using the same geometry as the single pass part and adding an orthogonal set of strands. The cure depth measured in this case represented the juncture of two strands. Effective laser scan rates used for working curve parts ranged from 2.0 to 58 cm/s.

Dynamic mechanical measurements were made using Rheometrics RSAII dynamic mechanical analyzer. The measurements were made in tensile oscillation at a frequency of 1 Hz, and with a strain amplitude of approximately 0.05%. All samples were heated to 150° C. and cooled quickly before testing to eliminate physical aging effects.

Dielectric analysis was used to analyze 1) order in aligned monomers as a function of temperature, and 2) the re-orientation dynamics of the monomers as a function of temperature when the poles of the aligning magnet were rotated 90 degrees.

Figure 3A:
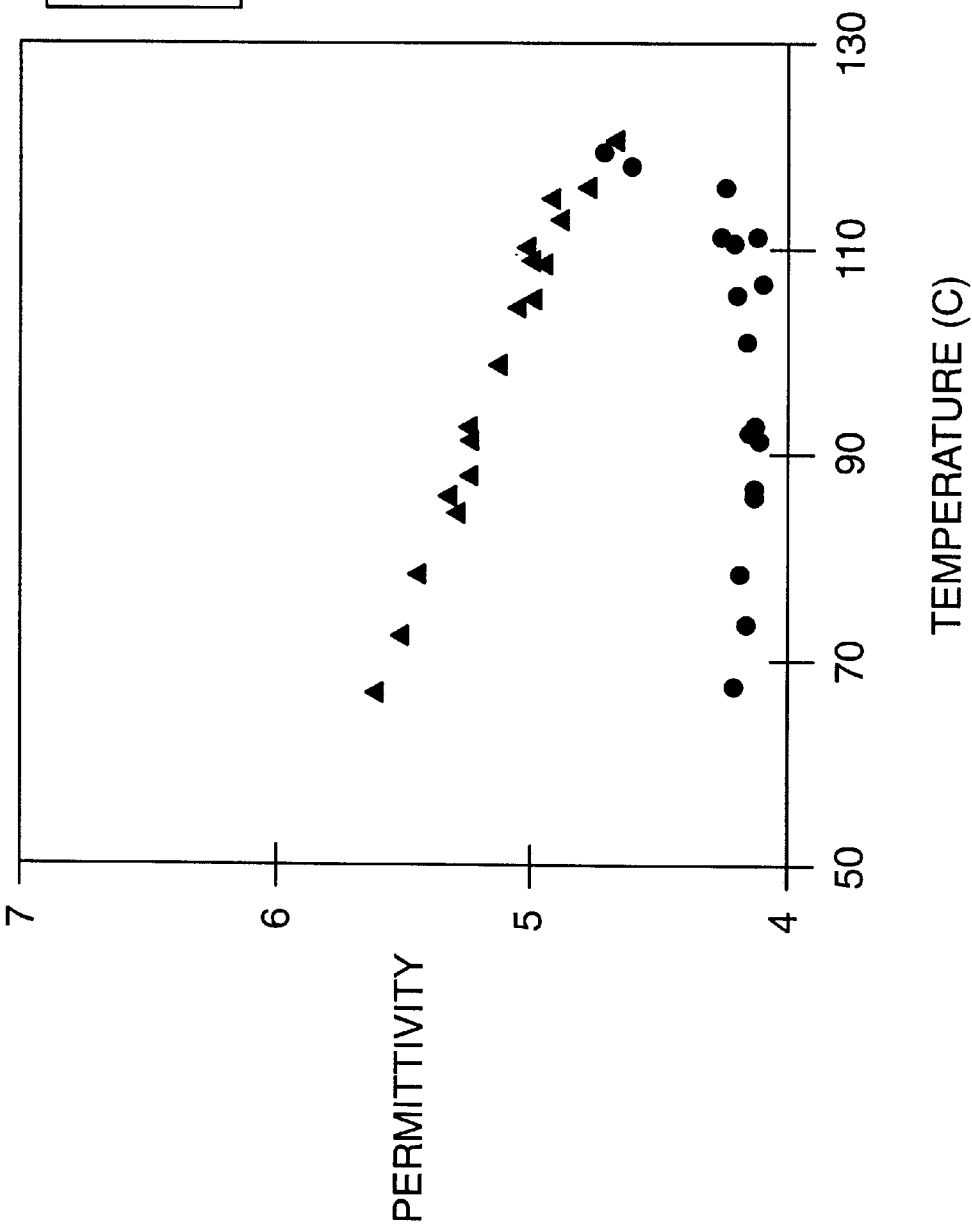
FIG. 3A is a graph of dielectric permittivity plotted as a function of temperature for monomer N1.
Figure 3B:
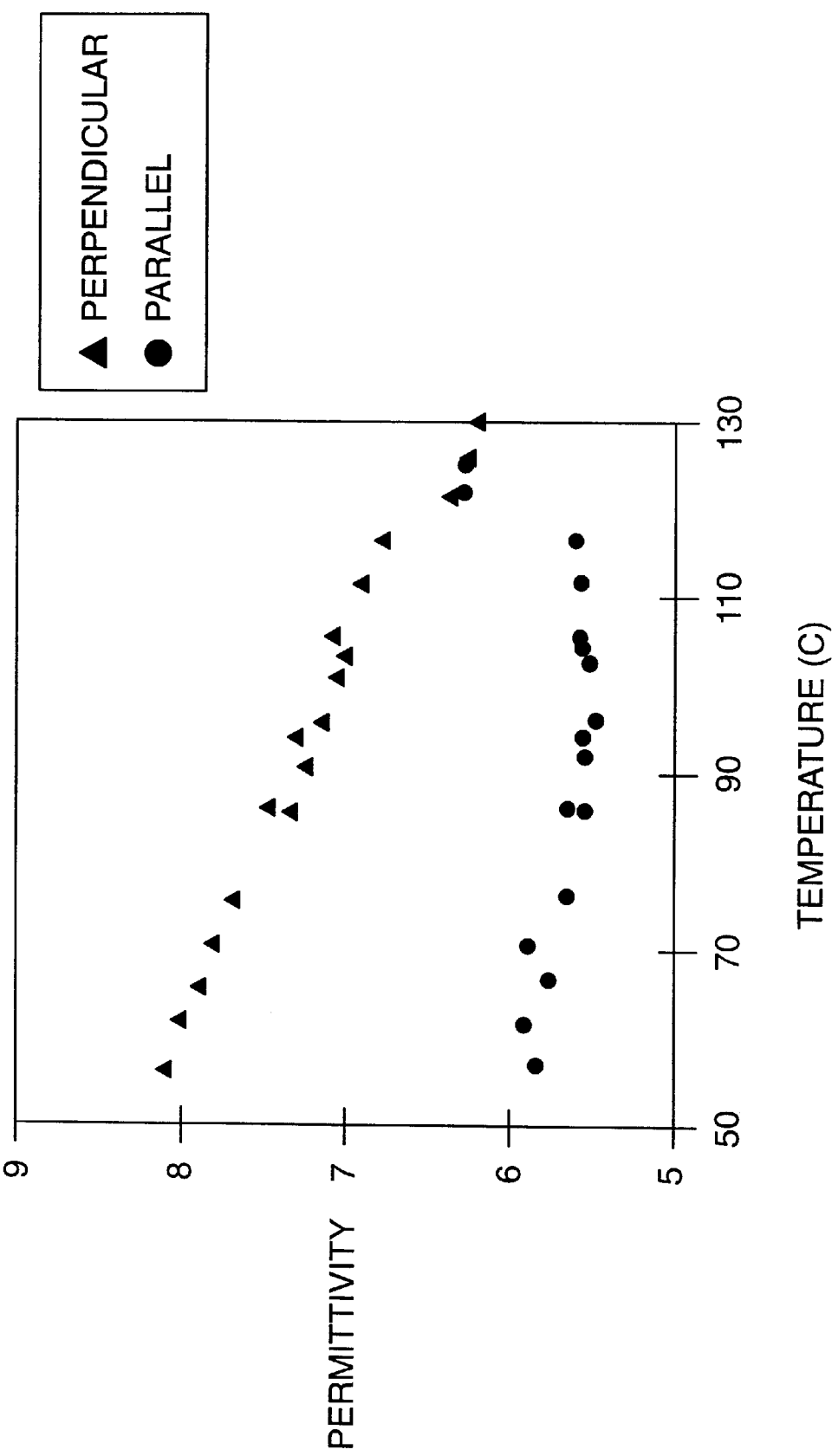
FIG. 3B is a graph of dielectric permittivity plotted as a function of temperature for monomer N2.

Though the order of a liquid crystal cannot be directly measured, it can be estimated based on the anisotropy of a macroscopic material property—dielectric permittivity being one such property. Permittivities were measured with two magnetic field arrangements: with the magnetic field parallel to the electric field of the impedance analyzer, $\epsilon'\|$, and with a magnetic field orthogonal to the electric field of the impedance analyzer, $\epsilon'\bot$. FIG. 3A shows the results for monomers N1 and FIG. 3B shows the results for monomer N2, both over a wide temperatures range. In the nematic state, as the nematic-to-isotropic transition temperature ($T_{n \to i}$) is approached, the anisotropy in permittivity decreases indicating a more random order. Above $T_{n \to i}$, the anisotropy in the permittivity disappears and the dielectric the permittivity is single-valued. Thus, the difference in dielectric permittivity (measured at 0° and 90° relative to the imposed magnetic filed) can be used to determine the amount of order.

Figure 4A:
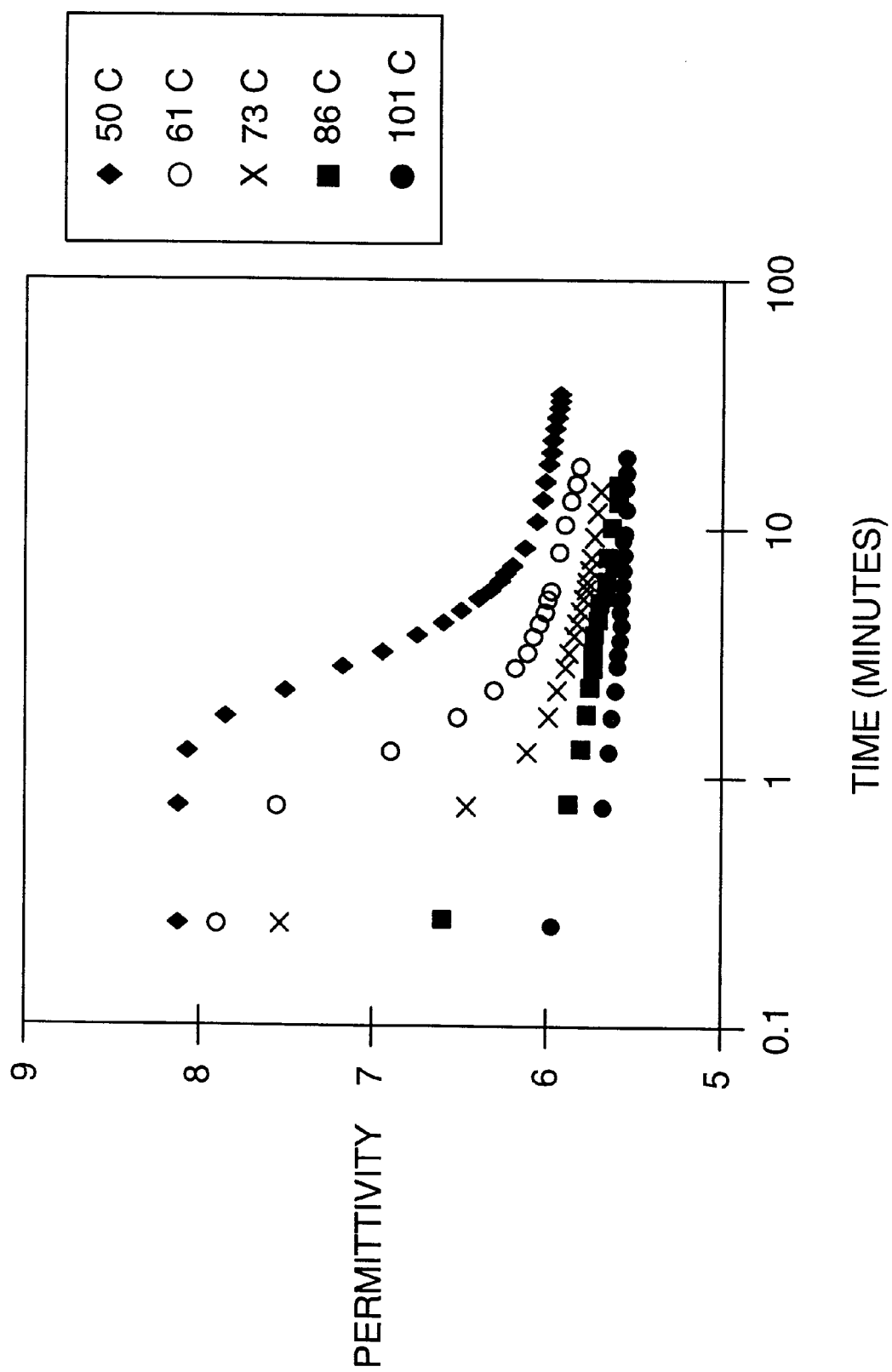
FIG. 4A is a graph of dielectric permittivity measured as a function of time for the N2 resin after changing the magnetic field from parallel to perpendicular.
Figure 4B:
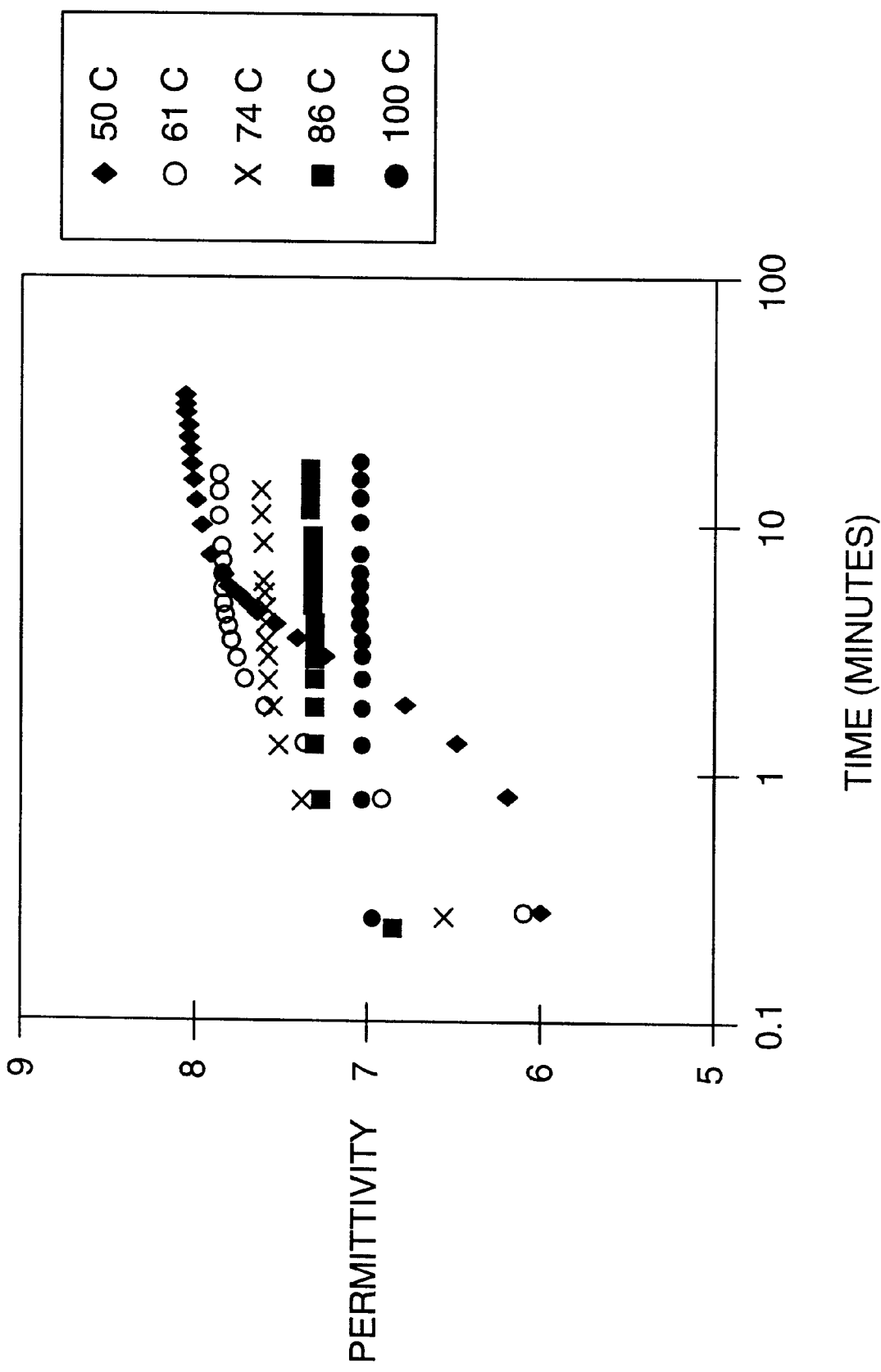
FIG. 4B is a graph of the dielectric permittivity measured as a function of time for the N2 resin after changing the magnetic field from perpendicular to parallel.

The value of the permittivity can also be used to follow changes in orientation of the mesogens. In determining how long it would take to change molecular alignment because of the potential need for doing this during the stereolithography build process, a magnetic field was used to align the monomer initially in one direction and then the field was rotated 90° and the permittivities monitored over time. FIG. 4 shows the results for experiments conducted at various temperatures. The time to re-orient is very much temperature dependent. At temperatures above about 85° C. the re-orientation was accomplished in less than one minute. At lower temperatures it took several minutes for re-orientation to occur. The time required to re-align the monomer can be reduced by applying a shearing force along with the magnetic field.

Factors that affect polymerization kinetics affect the values of the working curve parameters for the liquid crystal monomers studied. A simple experiment was devised to measure laser UV light transmission through the nematic monomer before, during and after laser exposure. It was determined from this that the formed polymer more strongly absorbs the UV light than the monomer in the nematic state. Thus, photo-initiator type and content were found to strongly affect the working curve parameters. Processing conditions such as time and temperature also affected the working curve parameters. At temperatures approaching the nematic to isotropic transition (within 20° C.) re-orientation of the molecules occurs quickly-less than one minute, making the process suitable for rapid prototyping.

Figure 5:
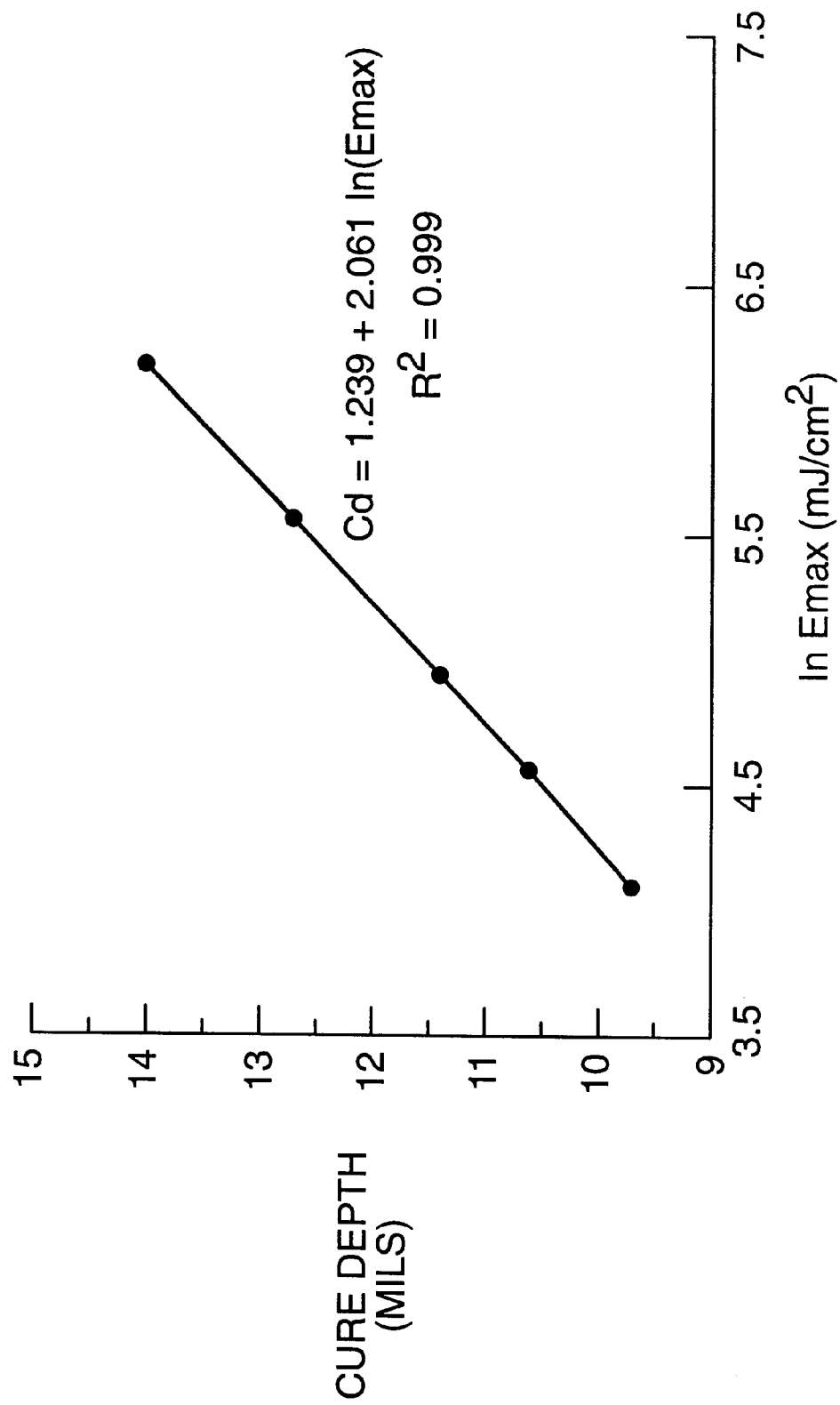
FIG. 5 is a graph of a working curve for the N2 resin in the nematic state at 100° C. with an Argon ion laser.

An initial concentration of IRAGACURA 369, a photo-initiator available from Ciba-Geigy, by weight of 2% was used in the resins N1 and N2. Working curve parameters for these formulations were lower in value than typical commercial stereolithography resins. For example the parameters for the N2 resin cured in the nematic state at 100° C. were: $D_p$=2.06 mil and $E_c$=0.55 mJ/cm$^2$. The Argon ion laser was operating at 364 nm and the power at the vat was measured to be 14 mW. FIG. 5 shows the working curve for these parameters.

Figure 6:
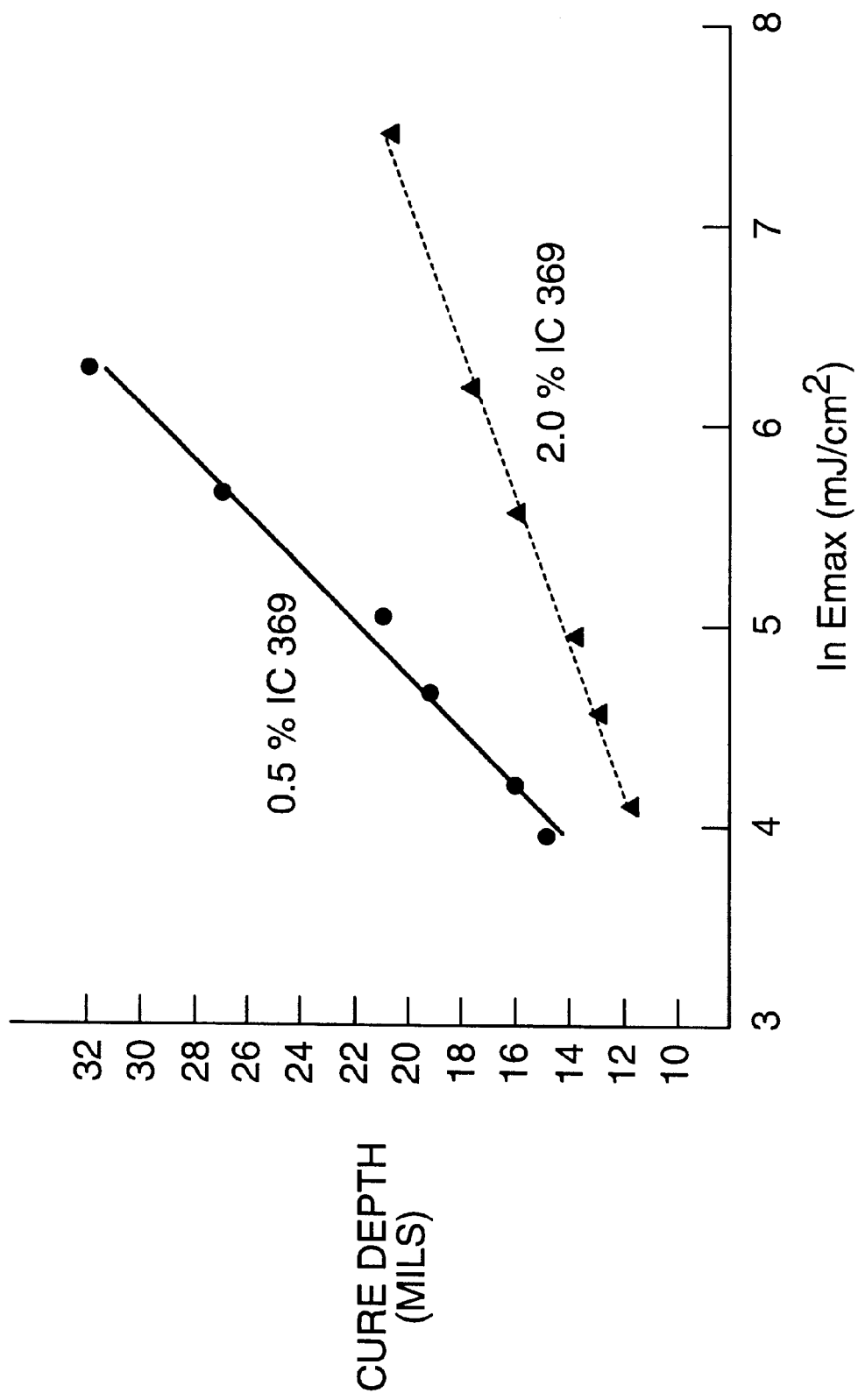
FIG. 6 is a graph of comparison working curves for the N1 resin containing different amounts of photoinitiator.

The N1 resin has been studied more extensively to date. With 2% IC 369 the $D_p$ parameter ranged from 1.2 to 2.7 mils depending on the processing conditions. For example, decreasing the temperature from 100° C. to 85° C. resulted in an increase in the penetration depth from 1.2 to 2.7 mils and an increase in the critical energy from 0.001 to 0.7 mJ/cm$^2$. The rate of polymerization is higher at 100° C. than at 85° C. When the concentration on the photoinitiator was decreased from 2% to 0.5%, the working curve parameters were affected significantly as shown in FIG. 6. Under the same processing conditions (85° C. and 14 mW power at the vat), the lower concentration (0.5% IC 369) resulted in a $D_p$=7.3 mil and $E_c$=7.4 mJ/cm$^2$.

TABLE 1

Dimensions for N1 strands drawn with magnet in place.

| Cure depth (mils) - at strand intersections | Cure width (mils) - strands parallel to magnetic field | Cure width (mils) - strands perpendicular to magnetic field |
| --- | --- | --- |
| 26.6 | 10.0 | 16.5 |
| 23.7 | 7.8 | 12.8 |
| 20.3 | 7.4 | 11.7 |
| 16.9 | 6.2 | 11.3 |
| 11.8 | 6.0 | 10.4 |
| 10.9 | 5.1 | 7.8 |

In the nematic state it was found that magnetic field alignment affected both the strand cure depth and width significantly. Table 1 compares strand widths for strands drawn parallel to and perpendicular to the magnetic field. The cure depths reported in the Table represent the juncture of a parallel and a perpendicular strand. Strand widths for strands drawn perpendicular with the magnetic field were on average 66% larger than strands drawn parallel with the magnetic field. When the resin was cured in the isotropic state there was no difference in strand dimensions for strands drawn in one direction versus another. In the aligned nematic state scattering occurs anisotropically and is more pronounced in the direction of molecular alignment.

Figure 7:
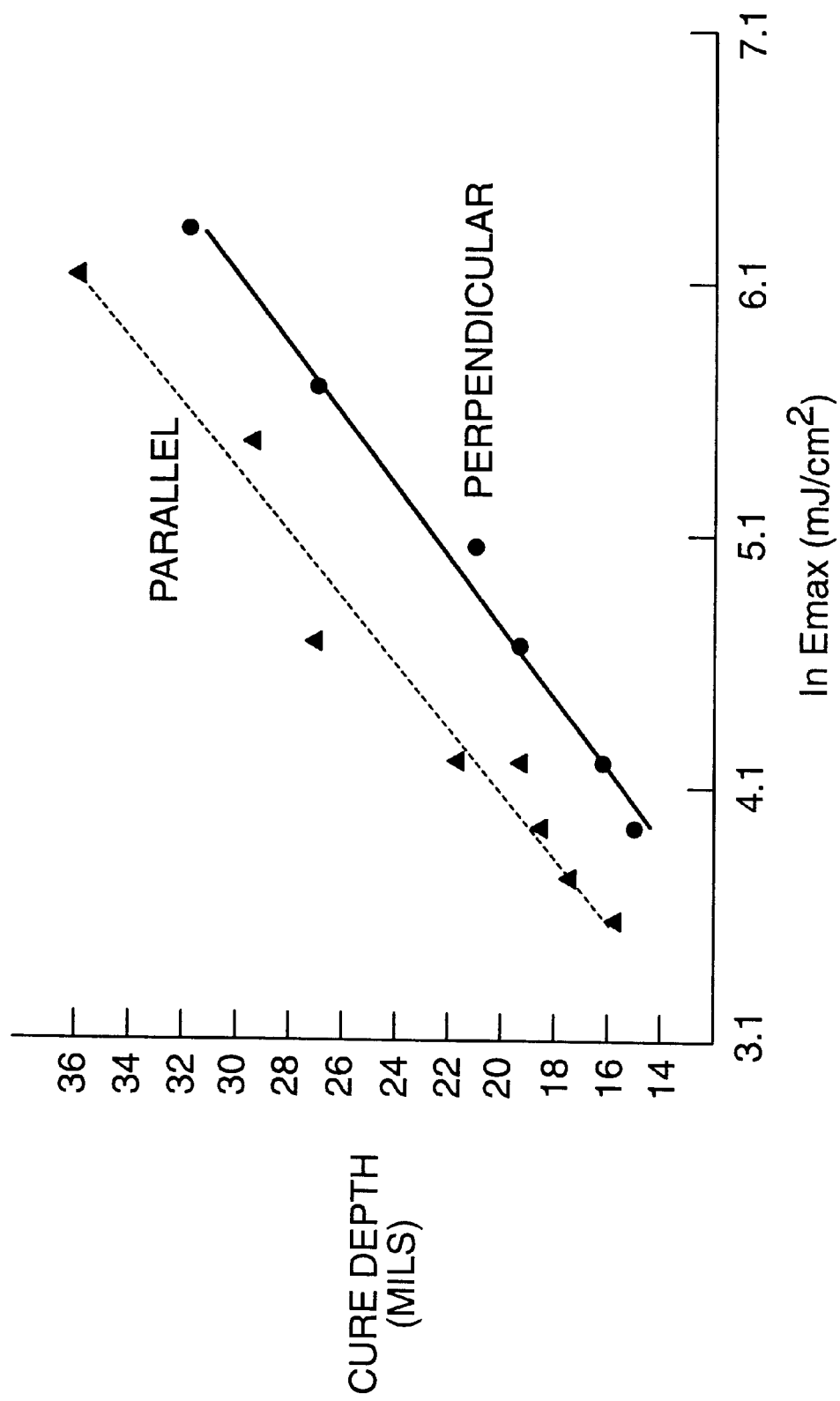
FIG. 7 is a graph of comparison working curves for the N2 resin for strands drawn parallel to the magnetic field and strands drawn perpendicular to the magnetic field.

As might be expected based on the above finding, cure depths were greater for strands drawn parallel to the magnetic field compared with the strands drawn perpendicular to the field using equivalent energy densities. FIG. 7 compares working curves for these two cases. The measured penetration depth decreased slightly (8%) going from the parallel to the perpendicular case. However, the corresponding change in critical energy was large, an increase of 51%. This change is consistent with the notion that greater light scattering occurs along the molecular alignment direction.

Working curves for "double pass" parts have also been generated. These parts consist of orthogonal vectors spaced 20 to 40 mils apart such that there is no overlap of adjacent vectors. Working curves for these parts indicate an increase in the critical energy and a decrease in the penetration depth compared with the parameters for single-pass parts made under the same conditions. These differences are expected because the cured resin absorbs the laser light more highly than the resin.

DMA was used to measure the glass transition temperatures ($T_g$) of green and postcured specimens built in the apparatus shown in FIG. 2 using an Argon ion laser delivering 33 mW of UV power to the vat. An external magnet was used to induce unidirectional orientation in the monomer. Green $T_g$'s for the N1 resin varied from 51 to 61° C. depending on the cure temperature. The measured $T_g$'s for postcured N1 specimens ranged from 75° C. to 94° C. Green $T_g$'s for the N2 resin ranged from 57 to 82° C. while the $T_g$'s of postcured specimens ranged from 112 to 145° C. Note that the $T_g$ is taken to be the peak in the loss modulus. Peak tan delta values are generally 20 to 30° C. higher than $T_g$ values measured by the loss modules.

Figure 8:
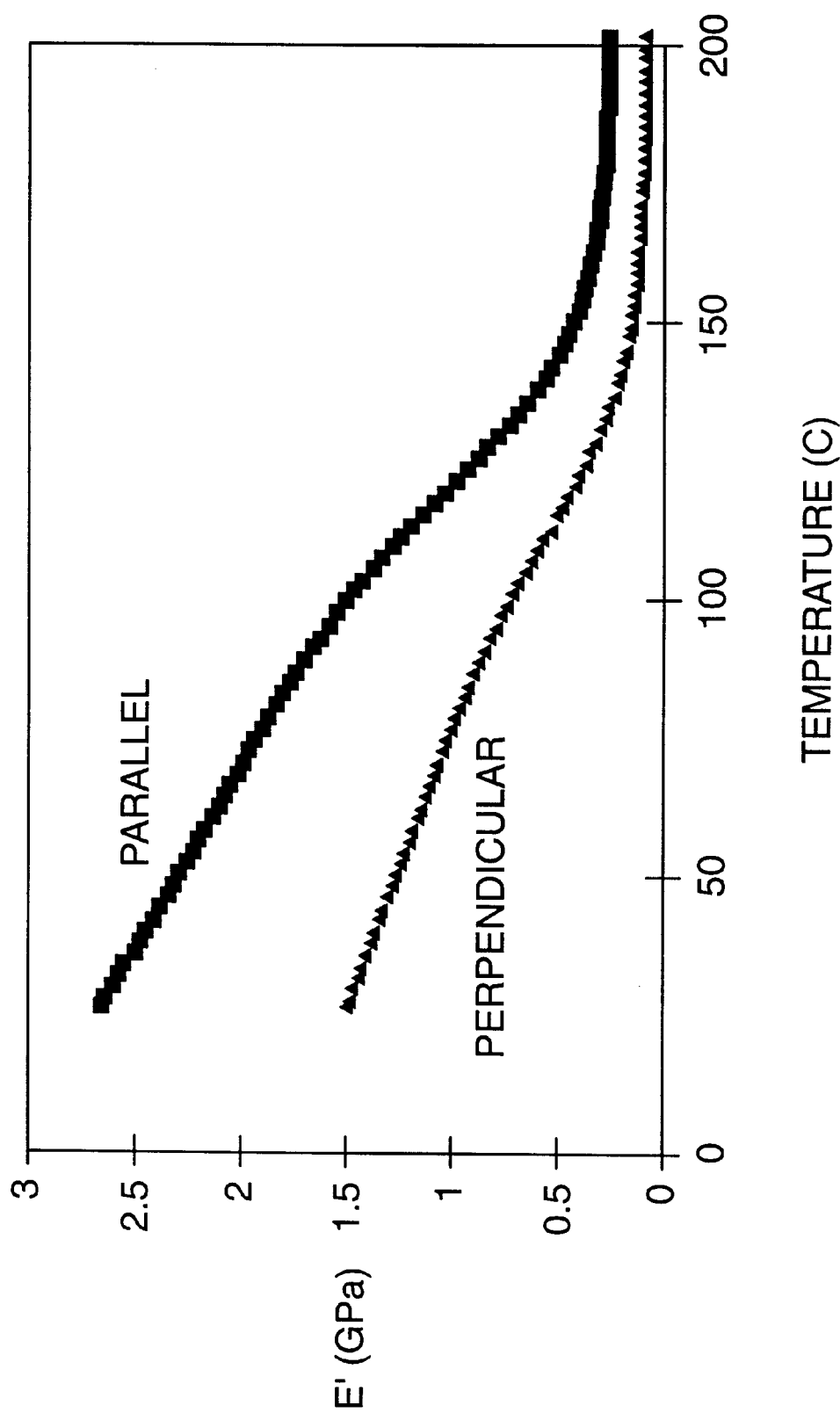
FIG. 8 is a graph of a comparison of the dynamic elastic moduli for N2 specimens.

FIG. 8 shows the results of DMA analysis of two aligned samples of the N2 resin after postcure. For one sample the test direction was parallel to the molecular alignment direction, and for the other the test direction was perpendicular to the molecular alignment direction. The mechanical anisotropy is almost a factor of 2. At room temperature, the modulus in the alignment direction was measured to be 2.8 GPa at 1 Hz. The modulus measured in the transverse direction was 1.6 GPa.

While certain representative embodiments and details have been shown for purposes of illustrating the invention, it will be apparent to those skilled in the art that various changes in the methods and apparatus disclosed therein may be made without departing from the scope of the invention, which is defined in the appended claims.

What is claimed is:

1. A method for producing ordered parts by stereolithography comprising:
   a) providing a non-ordered liquid crystal rigid rod monomer in the nematic state
   b) using a magnetic field produced by a rotating permanent magnet to align the molecular orientation within said non-ordered liquid crystal rigid rod monomer to form an aligned monomer,
   c) photopolymerizing via stereolithography the aligned monomer to produce a part having upper use temperatures exceeding 100° C.

2. The method of claim 1 wherein said permanent magnet has a field strength of 3200 Oersted across a gap of 10 cm.

3. The method of claim 1 wherein said part has a build axis and said molecular orientation is aligned at an angle relative to the build axis.

4. The method of claim 1 wherein said part is a layered part having a build axis and the molecular orientation within sections of each layer are aligned by controlling the angle between the magnetic poles of said permanent magnet and the build axis.

5. The method of claim 1 wherein said part is a strand and said strand is drawn along a direction either parallel or perpendicular to said magnetic field.

6. The method of claim 1 wherein said monomer is selected from the group consisting of:

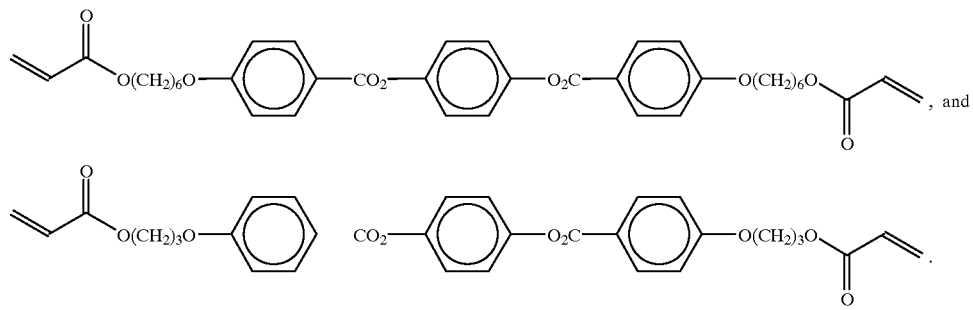

, and

7. The method of claim 1 wherein a photoinitiator is added to said liquid crystal monomer prior to photopolymerizing.

8. The method of claim 7 wherein said photoinitiator is added in an amount of between about 0.1 and about 4.0% by weight.

9. The method of claim 1 further including the step of heating said liquid crystal monomer prior to photopolymerizing.

10. The method of claim 9 wherein said liquid crystal monomer is heated at between about 50° C. and about 150° C.

* * * * *